UNITED STATES PATENT OFFICE 2,380,350

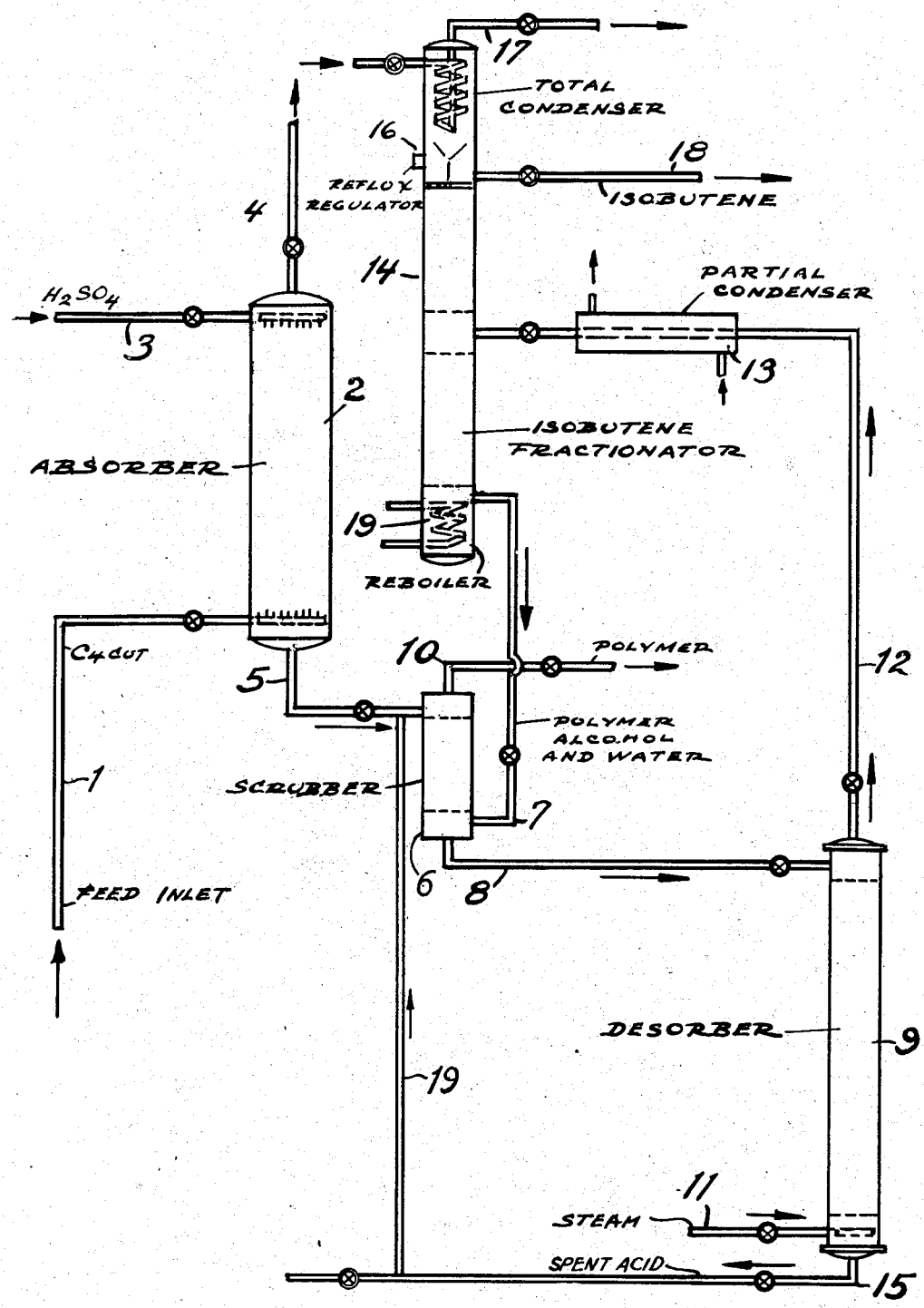

RECOVERY AND REGENERATION OF ISOBUTENE

Earl E. Willauer, Cranford, and Insley P. Jones, Basking Ridge, N. J., assignors to Standard Oil Development Company, a corporation of Delaware Application July 11, 1942, Serial No. 450,524

3 Claims. (Cl. 260—677)

The present invention relates to improvements in the process for the separation and recovery of isobutene from mixtures of olefins and saturated hydrocarbons and more particularly to a method of recovery and regeneration of isobutene from acid solutions used to extract isobutene from mixtures of saturated and unsaturated hydrocarbons.

There are many chemical processes in which it is a decided advantage to use a substantially pure isoolefin, unmixed with diluents, such as saturated hydrocarbons. For example, in chemical reactions with the gaseous isoolefins in which pressure is advantageous, the effective pressure is normally the partial pressure of the reactive isoolefin in the mixture. In such cases, substantially pure isoolefins permit much lower pressures to be employed and less gas to be compressed than in the case of gas mixtures poor in reactive isoolefins. Also, in many cases the isoolefin reaction may be reversible, the proportion of the desired product being dependent upon the concentration of reactive isoolefin in the mixture. In such cases, the dilution of the isoolefin in the mixture with a diluent, such as a saturated hydrocarbon, may so affect the yield of the desired reaction product as to render the process unprofitable. Also, the desired reaction product may be very volatile or the chemical reagent used to react with isoolefin may be very volatile and carried away by the relatively unreactive diluent.

When paraffins and olefins are dehydrogenated to form diolefins, the diolefins are separated and the residual hydrocarbons recycled to be further dehydrogenated. The isoolefins present do not dehydrogenate but gradually accumulate and reduce the yields of the diolefins considerably, therefore, it is necessary to remove the isoolefins from the recycle stock if suitable yields are to be obtained.

It is known in the art that isoolefins may be dissolved from a hydrocarbon mixture by contacting with sulfuric acid solutions and that these isoolefins may be recovered by diluting and heating the acid solution. In the processing of a $C_4$ cut it is established practice to remove the isobutene first by contacting the hydrocarbon mixture with a sulfuric acid solution of approximately 65% concentration and at a temperature of approximately 65° F. The acid extract is diluted with steam and heated to remove overhead a gaseous mixture of isobutene, polymer, tertiary butyl alcohol, ether, and water. This vapor mixture is fractionated for the recovery of isobutene. Where maximum isobutene recovery is to be had it is imperative that the regeneratable higher boiling compounds be continuously recycled to the regeneration zone.

When steam stripping normal butene from acid extracts, the total recycle stream can be returned to the regeneration zone, the polymer being continuously removed with the spent acid. However, in the case of isobutene regeneration where lower acidities and somewhat lower regeneration zone temperatures are employed, the polymer formed is chiefly dimer and co-dimer and as such is too low boiling for removal with the spent acid resulting in a build-up of this material within the regeneration zone.

A satisfactory utilization of the liquid residue from this fractionation, which consists largely of polymer and alcohol, has not previously been developed and it constitutes a considerable loss of isobutene. By existing procedure, approximately 65–75% of the isobutene initially present in $C_4$ cut are recovered whereas approximately 25–35% are converted to other less desirable liquid products. Even when these liquid products were redistilled by complicated procedure involving ternary azeotropes the quantity of isobutene recovered was relatively low.

It is an object of this invention to substantially increase the amounts of isobutene that are recovered where sulfuric acid is used as the absorbent for the separation of isobutene from the saturated and unsaturated hydrocarbons.

Another object of this invention is to recover at least 90 to 95% of the isobutene in pure form and substantially reduce the amount of undesirable products that are produced. This and other objects of the invention will be more clearly understood with reference to the drawing.

A $C_4$ cut containing both unsaturated and saturated hydrocarbons is first treated with sulfuric acid of 65% concentration at a temperature approximately 65° F. to remove isobutene that is present.

Referring to the drawing, the $C_4$ cut is passed through a pipe 1 at the bottom of absorber 2 where sulfuric acid at 65% concentration is introduced through pipe 3. The $C_4$ cut passes in countercurrent flow to the sulfuric acid and the unabsorbed gases containing the saturated, together with the unabsorbed unsaturated hydrocarbons are removed from absorber 2 through pipe 4. The sulfuric acid with the isobutene in solution is removed from the absorber 2 by means of pipe 5 and passed to scrubber 6 where it passes in countercurrent flow to a mixture of polymers, alcohol and water introduced into scrubber 6 by means of pipe 7. A temperature not over about 60° F. is maintained in scrubber 6. A continuous acid phase is maintained in scrubber 6. The sulfuric acid with the isobutene in solution and also the alcohol and water, is removed by means of pipe 8 and passed to desorber or regenerating zone 9 while the polymer, substantially free of water and alcohol, is removed from scrubber 6 by means of pipe 10. In desorber 9, steam is introduced in the lower part by means of pipe 11 and passes in countercurrent flow to the sulfuric acid containing the isobutene in solution introduced by means of pipe 8. Sufficient steam is added to yield a spent acid of 43 to 45% sulfuric acid concentration. The temperature of the desorber 9 is maintained between 250 and 325° F., preferably from 160–260 F., and it may be operated under atmospheric pressure. Adiabatic temperature conditions can be maintained in the desorber by means of outside heating jackets (not shown).

The overhead product consisting substantially of isobutene with a small proportion of polymer and alcohol and water is removed through pipe 12, passed through partial condenser 13 into the center portion of the isobutene fractionator 14. The spent acid is removed from desorber 9 by means of pipe 15. The fractionator 14 is provided with a reflux regulator 16 and a total condenser 17 at the upper part of the fractionator. Substantially pure isobutene of at least 90% purity is removed from the upper part of the fractionator through pipe 18 and the residual liquid consisting of polymers, alcohol and water is recycled from the bottom part of the fractionator through pipe 7 to scrubber 6. A reboiler 19 is provided at the bottom of the fractionator to maintain the desired temperature.

The spent acid of 43 to 45% sulfuric acid concentration removed by pipe 15 may be recycled through line 19 to the scrubber 6 to scrub the polymer, alcohol and water introduced into the scrubber by means of pipe 7. This acid not only serves as an efficient scrubbing agent, but also reduces the olefin/acid molar ratio within the desorber 9. The spent acid and alcohol dissolved therein could be returned to the top or an intermediate point in desorber 9.

Alternately other methods of contacting the $C_4$ cut with the sulfuric acid of 65% concentration may be used such as a turbine-type mixer in which both the $C_4$ cut and sulfuric acid are introduced simultaneously and withdrawn after mixing to a settling chamber to separate the extract phase and the unabsorbed $C_4$ hydrocarbons.

The following table illustrates the efficiency of the process. Isobutene yields of at least 90 to 95% are obtainable by following this process.

TABLE 1

RECOVERY OF ISOBUTENE FROM ACID EXTRACTS

*Steam regeneration of acid extracts-polymer scrubbed from recycle stream*

Extract feed:
 Olefin to acid ratio—mol $C_4H_8$/mol $H_2SO_4$ _____ 0.475
 $H_2SO_4$ concentration _____ 65
Operating variables:
 Stripping steam—lbs./gal. of extract fed _____ 3.9
 Water addition to recycle—lbs./gal. of extract fed _____ 0.9

Olefin recovery—wt. per cent:
 As gas _____ 94.6
 As polymer _____ 3.7
 As carbon in spent acid_____ 0.5

Total hydrocarbons accounted for—per cent_____ 98.8
Analysis of regenerated gas:
 Per cent unsaturates_____ 99.3
 Per cent isobutene_____ 98.1
 Per cent n-butene (by difference)____ 1.2
Isobutene recovery—per cent_____ 94.6
Isobutene fractionator bottoms stream:
 Rate—vol. per cent of extract feed__ 62
 Polymer—vol. per cent_____ 7
Spent acid:
 Titratable acidity—wt. per cent $H_2SO_4$ _____ 44.5
 Carbon content—wt. per cent_____ 0.1

We claim:

1. Process of separating and concentrating isobutene which comprises the following steps, absorbing isobutene in a sulfuric acid solution of about 65% concentration at a temperature of about 65° F., passing the sulfuric acid with isobutene in solution in countercurrent flow to a mixture of polymers, alcohol and water obtained in a later stage of the process, separating the polymers and passing the sulfuric acid with alcohol and isobutene in solution into a regenerating zone, introducing sufficient steam to reduce the acid concentration to 43 to 45% and subjecting the acid solution to a temperature ranging from 250–325° F., separating an overhead of isobutene, polymers, alcohol and water, fractionally distilling such overhead to separate substantially pure isobutene and a residual liquid containing the polymers, alcohol and water, and recycling the residual liquid to contact the sulfuric acid with the isobutene in solution in countercurrent flow as aforesaid.

2. Process of separating and concentrating isobutene from mixtures of hydrocarbons containing isobutene comprising treating a mixture of hydrocarbons containing isobutene and butene with sulfuric acid of about 65% concentration at a temperature of about 65° F., separating the sulfuric acid solution, introducing sufficient steam to the sulfuric acid solution to reduce the acid concentration to 43–45% and raise the temperature of the sulfuric acid solution to 160 to 260° F., whereby polymers, alcohol and water are formed, separating an overhead distillate containing isobutene, polymers, alcohol, and water, fractionally distilling the overhead distillate to separate isobutene from a residual liquid, washing the residual liquid in countercurrent flow with sulfuric acid of 65% concentration with isobutene in solution, separating a layer of polymers resulting from said washing operation, and passing the acid solution to be steam diluted and distilled.

3. Process of separating and concentrating isobutene from mixtures of hydrocarbons containing saturated and unsaturated hydrocarbons which comprises extracting the isobutene from a mixture of hydrocarbons containing saturated and unsaturated hydrocarbons by means of sulfuric acid of 65% concentration maintained at a temperature of about 65° F., steam diluting the acid solution to reduce the acid concentration to 43 to 45%, and raising the temperature to 160° F. to 260° F., whereby polymers, alcohol and water are formed, separating an overhead distillate, fractionating the same to separate isobutene from a residual solution containing polymers, alcohol and water, and washing the residual solution with an acid solution obtained by contacting sulfuric acid of 65% concentration at a temperature of about 65° F., with a hydrocarbon mixture of saturated and unsaturated hydrocarbons containing isobutene, and separating a polymer layer, resulting from said washing operation.

EARL E. WILLAUER.
INSLEY P. JONES.